Dec. 30, 1958  G. W. SNARR  2,866,278
ARITHMETIC TEACHING AID
Filed Nov. 28, 1956  2 Sheets-Sheet 2
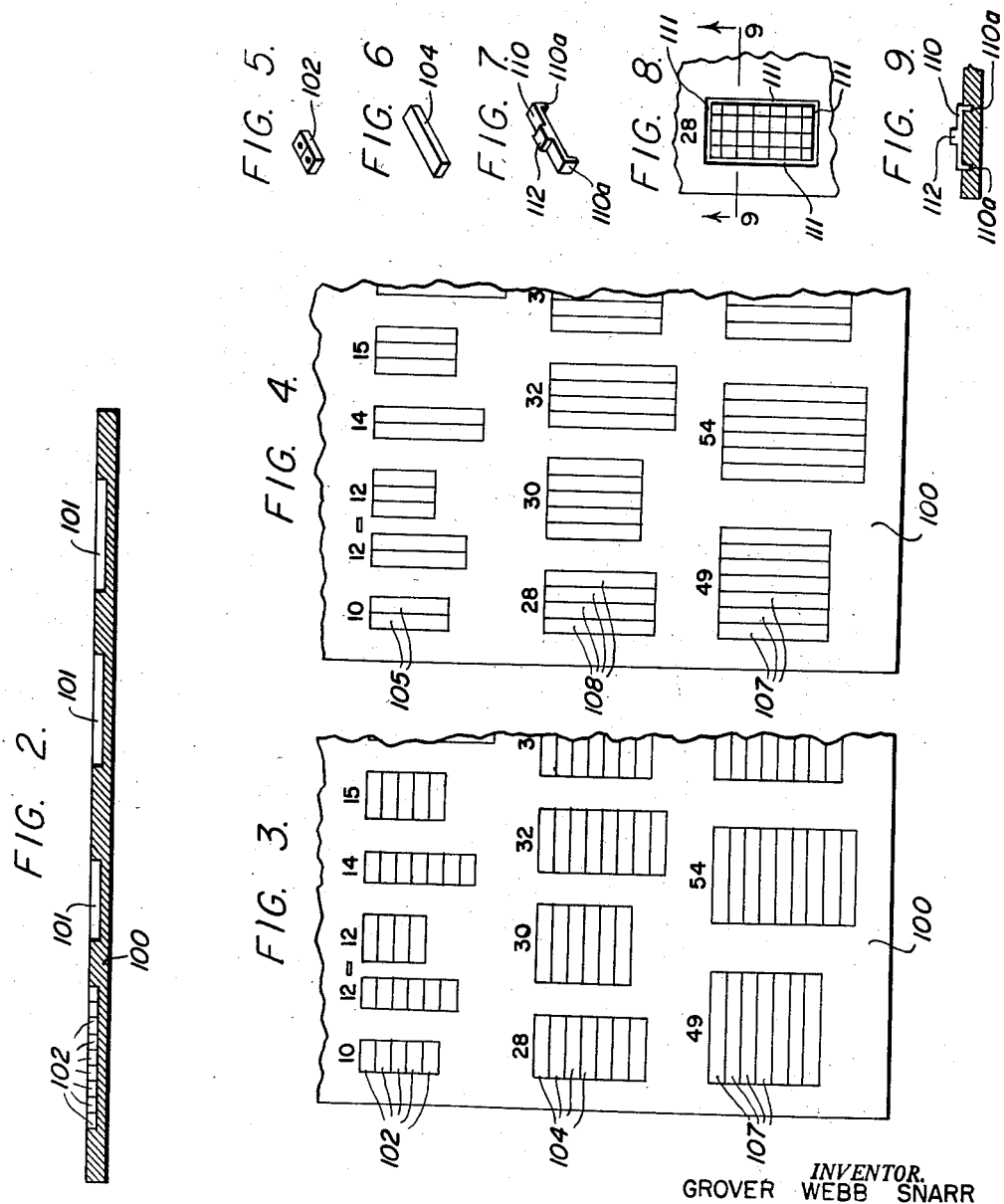
INVENTOR.
GROVER WEBB SNARR
BY
ATTORNEYS

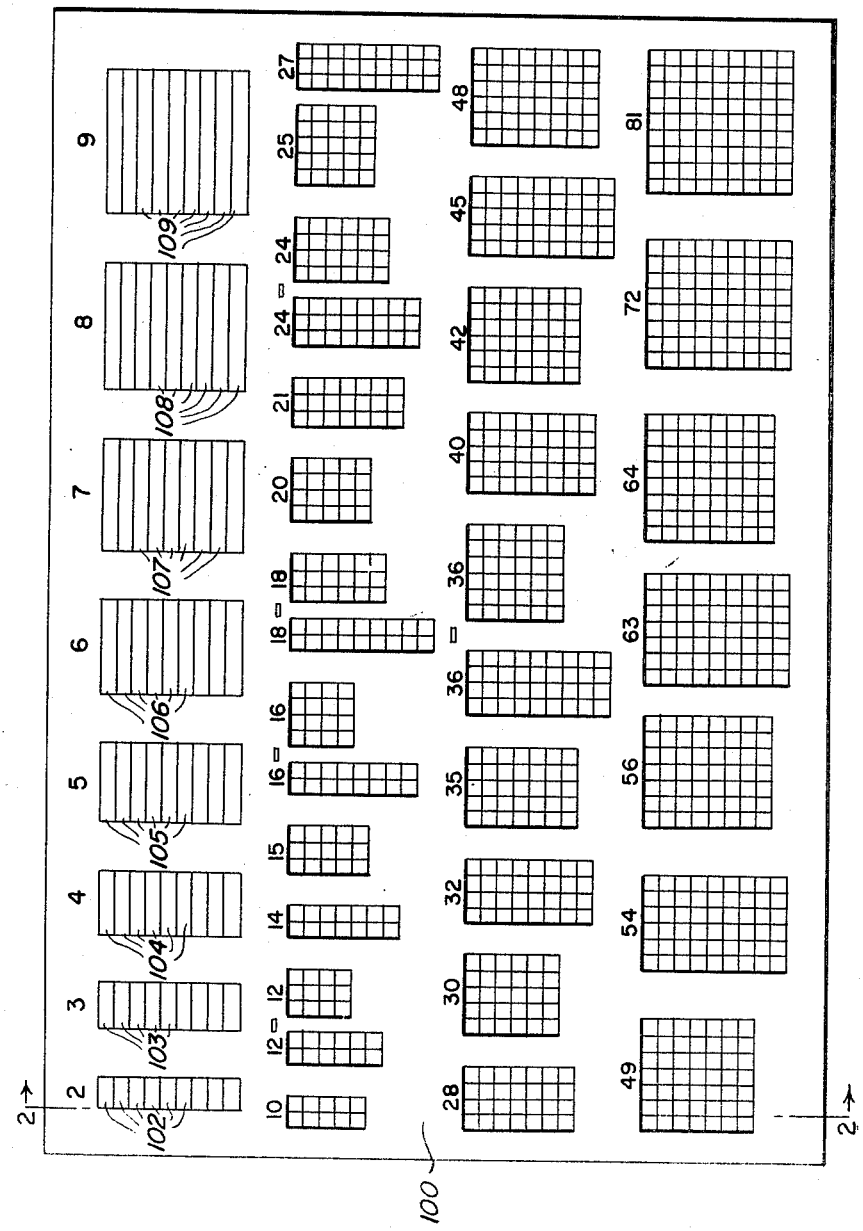

United States Patent Office 2,866,278
Patented Dec. 30, 1958

2,866,278

ARITHMETIC TEACHING AID

Grover Webb Snarr, Murray, Utah

Application November 28, 1956, Serial No. 624,852

14 Claims. (Cl. 35—31)

This invention relates to apparatus for aiding the teaching of arithmetic to young children, and is concerned particularly with providing apparatus of this type that is suitable for use both in school classrooms and at home.

As the principal of a grammar school, I have been impressed with the difficulty many children have in grasping the fundamental concepts behind multiplication and division. No satisfactory teaching aid has been available to teachers and parents for visually establishing the various digital relationships involved.

Principal objects of my invention are to enable a child to actually handle and arrange the digits he is working with in the study of arithmetic, particularly multiplication and division; to provide a child with pre-established geometrical patterns conforming to the product of various digits and with sets of digit pieces for selection by the child and placement by him in the geometrical patterns in accordance with proper arithmetical relationships; to provide apparatus that may be manufactured and sold at low cost; and to make the learning of arithmetic by a child interesting, challenging, and relatively easy.

In accomplishing these objects, I provide a work board and work pieces that resemble a game and that may be used over and over again. The work board carries a number of rectangles whose respective length and width dimensions establish the several multiples of the digits 2 to 9, inclusive. The work pieces are of elongate rectangular formation and are provided in sets corresponding to the width and length dimensions of the respective rectangles. Appropriate work pieces in appropriate number may be selected by a child to fill up any one or more of the rectangles in either of two possible ways and to provide a visual indication of the various digits involved in the arithmetical relationships represented by the respective rectangles.

Each set of work pieces is made up of nine identical work pieces. The lengths of the work pieces of the respective sets differ in the ratio of 2 to 9, inclusive, but their widths are the same. Thus, all the possible multiples of the digital numbers 2 to 9, inclusive, may be represented by the several rectangles of the work board, and such rectangles may be variously filled in by work pieces correspond either in length or in width therewith.

It is preferable that the work board have provision for carrying the several sets of work pieces in mutually segregated positions and that such positions be designated in accordance with the respective digits that the lengths of the corresponding work pieces represent.

Further objects and features of the invention will become apparent from the following detailed description of the particular specific embodiments illustrated by the accompanying drawings.

In the drawings:

Fig. 1 represents a top plan view of the work board of a preferred form of the apparatus of the invention, the sets of work pieces being carried and also designated by the work board;

Fig. 2, a vertical section taken on the line 2—2 of Fig. 1;

Fig. 3, a fragmentary view corresponding to the left-hand lower corner portion of Fig. 1 and showing work pieces in place in the several rectangles as they might be during use of the apparatus;

Fig. 4, a view corresponding to Fig. 3, but showing work pieces differently arranged in the several rectangles;

Fig. 5, a perspective view of one of the work pieces of the set designated "2" by the work board of Fig. 1;

Fig. 6, a similar view of one of the work pieces of the set designated "4" by the work board of Fig. 1;

Fig. 7, a view corresponding to that of Fig. 6, but illustrating a different form of work piece;

Fig. 8, a fragmentary view corresponding to that part of Fig. 1 comprehending the rectangle indicated "28," but showing a form of work board adapted to receive the work pieces of Fig. 7; and Fig. 9, a section taken on the line 9—9 of Fig. 8.

Referring to the drawings:

In the presently preferred form of the apparatus as illustrated in Figs. 1–6, the work board designated by the reference number 100 may be formed from any suitable material, the choice of material depending largely upon whether the apparatus is to be used as a utilitarian teaching aid in school or as merely a temporary aid or game at home. In the former instance, the work board is advantageously made of a durable material, such as wood or a plastic; in the latter instance, however, it may be satisfactorily made of a considerably less permanent material, such as heavy cardboard.

The work board is provided with individual work areas of mutually different dimensions, and such areas are clearly designated by respective numbers corresponding to the respective arithmetical products represented by such areas.

The individual work areas on the work board 100 are identified by the numbers 10, 12, 12, 14, 15, etc. through the arithmetical product 81, imprinted near the respective work areas. Such areas ar here defined on the upper face of the work board by means of variously sized recesses 101, Fig. 2, appropriately formed in the material of the work board by molding, cutting, or other suitable operation whose nature will depend on the type of material used for such work board.

The recesses 101 are of rectangular formation, and their arithmetical area values designated by the imprinting or other type of marking on the face of the work board represents the product of the width and length dimensions. In this connection, it is preferred that each area be lined by imprinting or other suitable marking to subdivide such area into small equal squares, as indicated, corresponding in number to the designated arithmetical value of that particular work area. In this way, there is a digital representation within such area of the arithmetical area value involved.

The work board 100 is also here shown as provided with similar rectangularly recessed areas for retaining the work pieces of the several sets in set-segregated relationship. These areas are designated by numbers, imprinted or otherwise marked on the face of the work board, which correspond to the digit value of the individual work pieces retained by the respective areas. Thus, as illustrated in Fig. 1, the work-piece-retaining areas are designed and identified by the digit numbers 2 or 9, respectively.

The individual work pieces are in this instance elongate rectangular bars, see especially Figs. 5 and 6.

Those corresponding to the digit "2" and retained by the recessed area 2 in Figs. 1 and 2 are identified by the reference numeral 102. Those representing the digit "3" and retained by the recessed area 3 are indicated 103, and so forth in like manner through the digits up to and including 9.

It is contemplated that the apparatus will be furnished with the various work pieces 102, 103, etc. fitted snugly in their corresponding retaining areas 2, 3, etc., Fig. 1, and retained therein by their friction fit. They may be made of any suitable material for the purpose, whether similar to or different from the material of the work board.

In using the apparatus, the number of work pieces from a particular one of the retaining areas 2, 3, etc. as may be necessary to fill a given work area 10, 12, etc. are selected and removed. They are then fitted into the particular work area concerned, the number of same required for the purpose providing one of the multiplier digits and the designated digit value thereof, either 2, 3, 4, etc., representing the other multiplier digit necessary to provide, by multiplication, the product number or arithmetical area value designating the particular area concerned.

It should be noted that each of the work areas designated by the product numbers or arithmetical area values 10, 12, 12, 14, etc. exactly accommodates work pieces from two different retaining areas, although the number of work pieces accommodated from the two are different. In this way, a challenge is presented to a child working with the apparatus and an opportunity is afforded him for exercising his intelligence in choosing how he will handle the filling in of any given work area with work pieces. Moreover, because of the digital relationships established between the work areas and the work pieces and the visual representation of same for observation by the child, the learning process is facilitated.

The embodiment of Figs. 7–9 indicates how the work pieces and the work board may be made to provide for more positive frictional retention of the work pieces and for easier removal of the individual work pieces from frictional retention by the work board.

To these ends, each of the work pieces of the several sets of same are provided with depending legs (110a) at respectively opposite ends of the work piece proper (110), and each of the retaining areas and work areas are defined by peripheral channels or grooves (111) for frictionally receiving the legs (110a) of the work pieces. Each of the work pieces is also provided with a knob-like protuberance (112) projecting upwardly from the top side thereof as a handle or finger-hold for facilitating manipulation of the work piece.

While there is no necessity of individually marking the several work pieces in a manner corresponding to or tying in with the digital value markings (2–9) applied to the work board adjacent the retaining areas, it may be found desirable to do so. Accordingly, each of the individual work pieces may be marked in some such manner as shown in Fig. 5.

Whereas this invention is here illustrated and described with respect to specific embodiments thereof, it should be realized that changes may be made within the scope of the following claims, without departing from the essential contributions to the art made by the teachings hereof.

I claim:

1. Apparatus for aiding the teaching of arithmetic, comprising a work board having a plurality of mutually different work areas defined on one face thereof for receiving work pieces; a plurality of sets of work pieces that differ in dimension from set to set but that are identical in dimension within any given set, the lengths of the work pieces of any given set being integral multiples of their widths, the widths of all work pieces being uniform and both the widths and the lengths of the respective work areas being integral multiples of the widths of the work pieces; indicating means associated with the respective sets of work pieces and ascribing a digital value to a dimension of the individual work pieces thereof which varies from set to set; and indicating means associated with the respective work areas and ascribing area values thereto; the individual work areas defined on the work board having dimensions, respectively, that exactly accommodate given pluralities of work pieces from one or another of at least two of the said sets of work pieces and that represent the factors of the respective area values, whereby the digital value represented by the said dimension of the work pieces used in any particular instance multiplied by the number of such work pieces used equals the area value ascribed to the particular work area concerned on said work board.

2. The apparatus of claim 1, wherein the individual work pieces are each provided with means for temporarily attaching the work piece to the work board.

3. The apparatus of claim 2, wherein the individual areas defined on the work board are each provided with attachment means correlated with the attachment means of the individual work pieces.

4. The apparatus of claim 3, wherein the individual work pieces are each provided with handle means facilitating manipulation thereof by a user.

5. The apparatus of claim 1, wherein the work board is provided with means for retaining the work pieces in segrated positions as individual sets.

6. The apparatus of claim 5, wherein the means for retaining the work pieces in sets comprehend individual areas, respectively, defined on the work board.

7. The apparatus of claim 6, wherein each of the work areas on the work board is rectangular in formation and each of the work pieces is of elongate rectangular formation; and wherein the individual work-piece-retaining areas are rectangular in formation and correspond in dimension with the dimensions of the respective sets of work pieces having the work pieces thereof arranged contiguously, side by side.

8. The apparatus of claim 7, wherein the work pieces are of bar formation, and both the work areas and the work-piece-retaining areas are defined by respective recesses in the work board arranged to frictionally retain said work pieces.

9. The apparatus of claim 1, wherein the work board is provided with means for retaining the work pieces in segregated position as individual sets, said retaining means comprehending individual areas, respectively, defined on the work board; and wherein the indicating means ascribing a digital value to a dimension of the individual work pieces comprise markings applied to the work board closely adjacent the respective areas making up said individual areas.

10. The apparatus of claim 9, wherein the indicating means associated with the respective work areas and ascribing area values thereto comprise markings applied to the work board closely adjacent the respective work areas.

11. The apparatus of claim 10, wherein the indicating means ascribing area values to the respective work areas also include line markings applied to the work board within the respective work areas for visually subdividing the respective areas into small equal squares corresponding in number to the respective area values.

12. The apparatus of claim 1, wherein the indicating means associated with the respective work areas and ascribing area values thereto comprise markings applied to the work board closely adjacent the respective work areas.

13. The apparatus of claim 12, wherein the indicating means ascribing area values to the respective work areas also include line markings applied to the work board within the respective work areas for visually subdividing the respective areas into small equal squares corresponding in number to the respective area values.

14. The apparatus of claim 1, wherein the digital values ascribed to a dimension of the individual work pieces of the respective sets range from 2 to 9, inclusive, and wherein the area values ascribed to the respective work areas range from 10 to 81, inclusive, in terms of various arithmetical products of the digits between 2 to 9, inclusive.

References Cited in the file of this patent

UNITED STATES PATENTS

| | | |
|---|---|---|
| 356,167 | Shannon | Jan. 18, 1887 |
| 1,826,034 | Williamson | Oct. 6, 1931 |
| 2,611,193 | Davis | Sept. 23, 1952 |
| 2,722,754 | Slote | Nov. 8, 1955 |

FOREIGN PATENTS

| | | |
|---|---|---|
| 321,251 | France | Sept. 5, 1902 |
| 529,461 | Great Britain | Nov. 21, 1940 |